Dec. 14, 1965 C. K. BENSON ETAL 3,223,024
FOOD WASHING AND COOKING APPARATUS
Filed Jan. 23, 1961 13 Sheets-Sheet 1
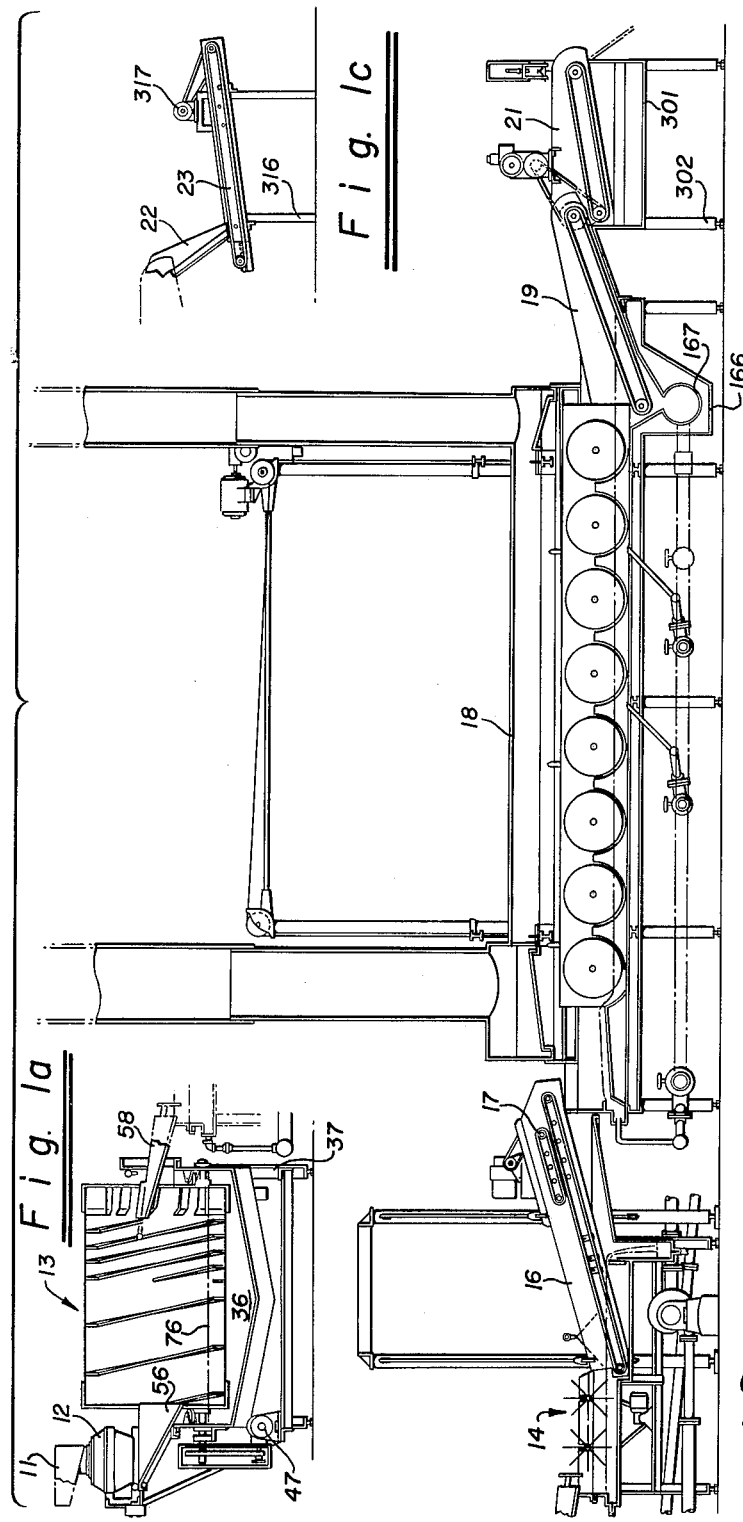
INVENTORS
Clark K. Benson
Andrew A. Caridis
Attorneys

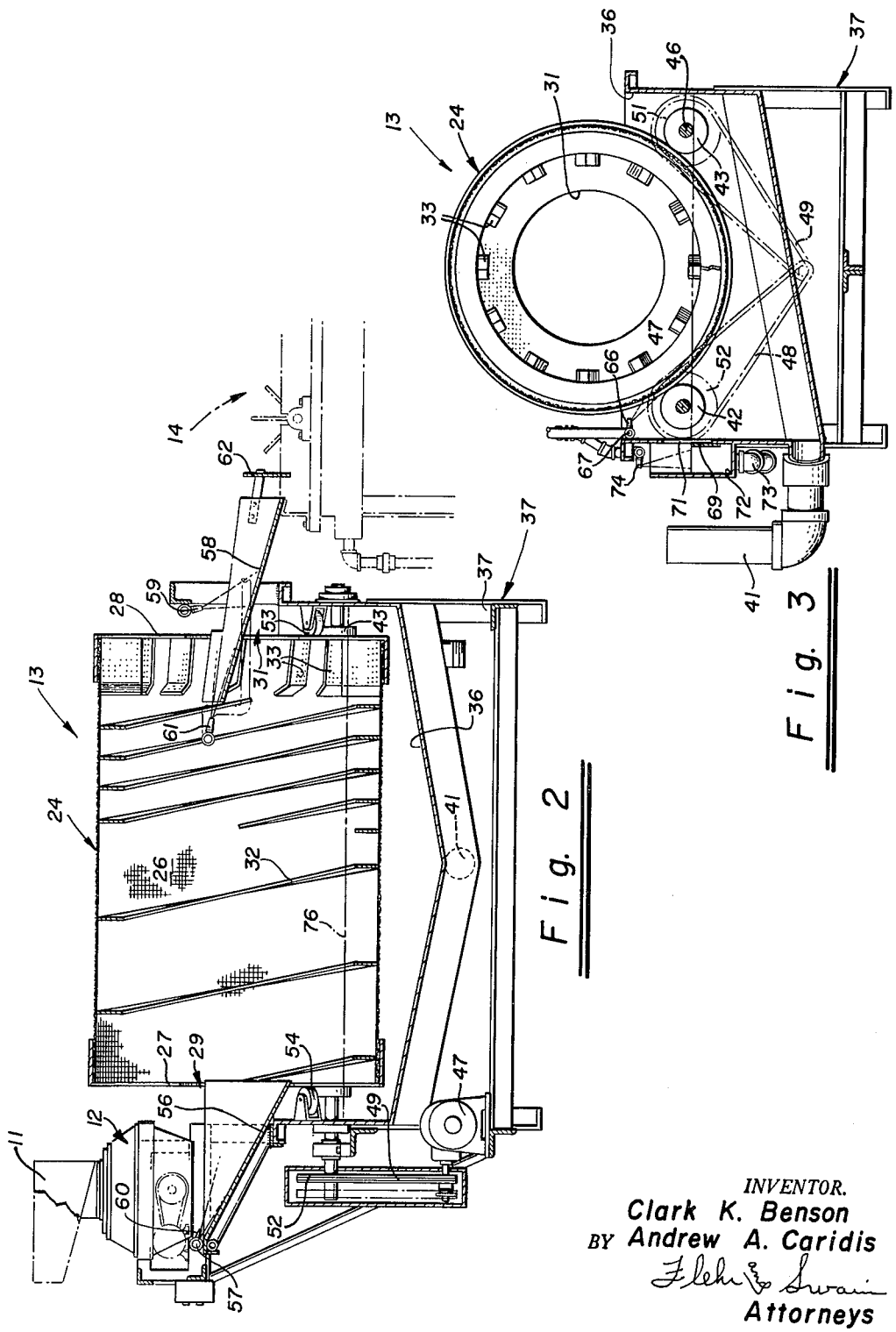

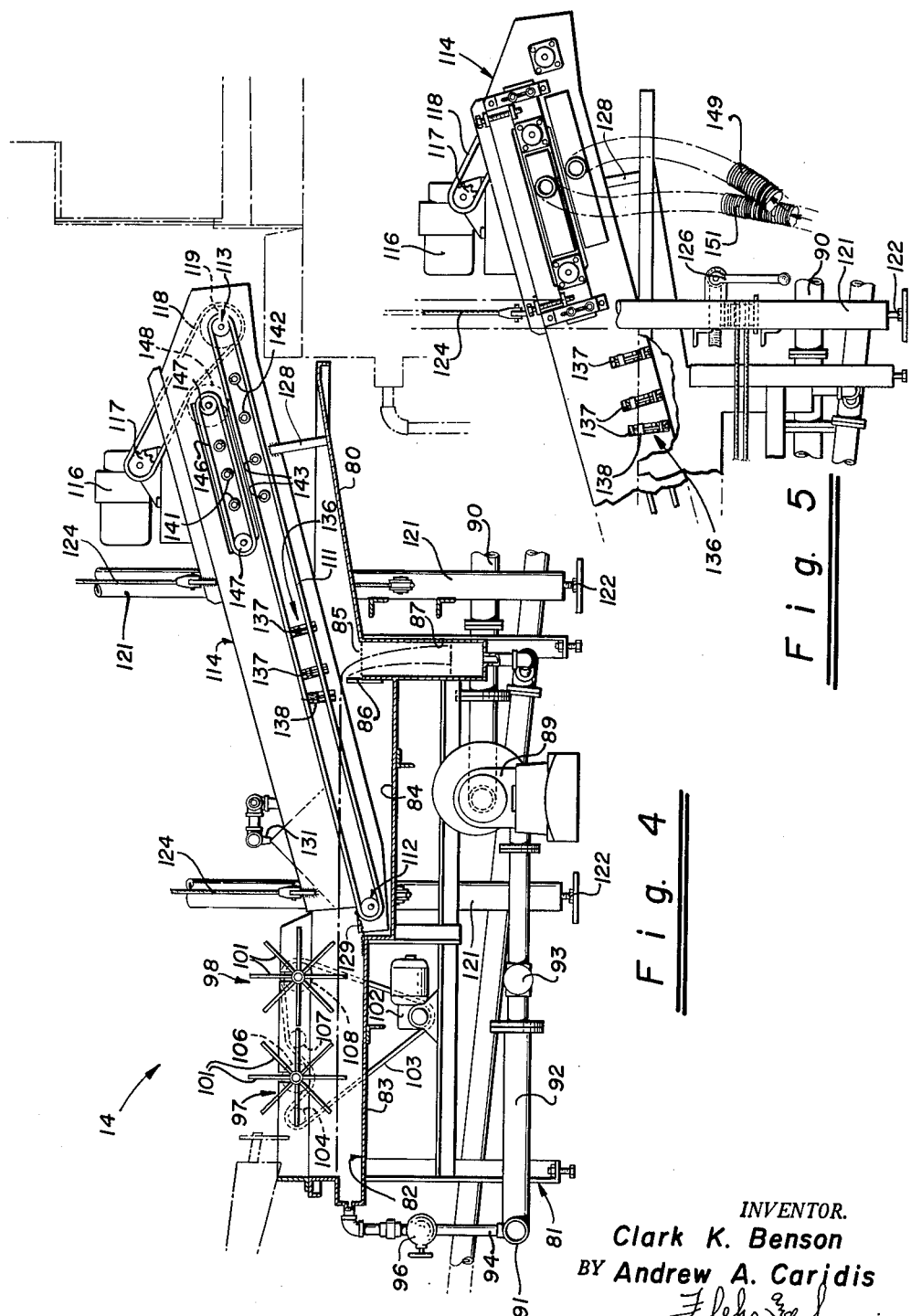

Dec. 14, 1965  C. K. BENSON ETAL  3,223,024
FOOD WASHING AND COOKING APPARATUS
Filed Jan. 23, 1961  13 Sheets-Sheet 4
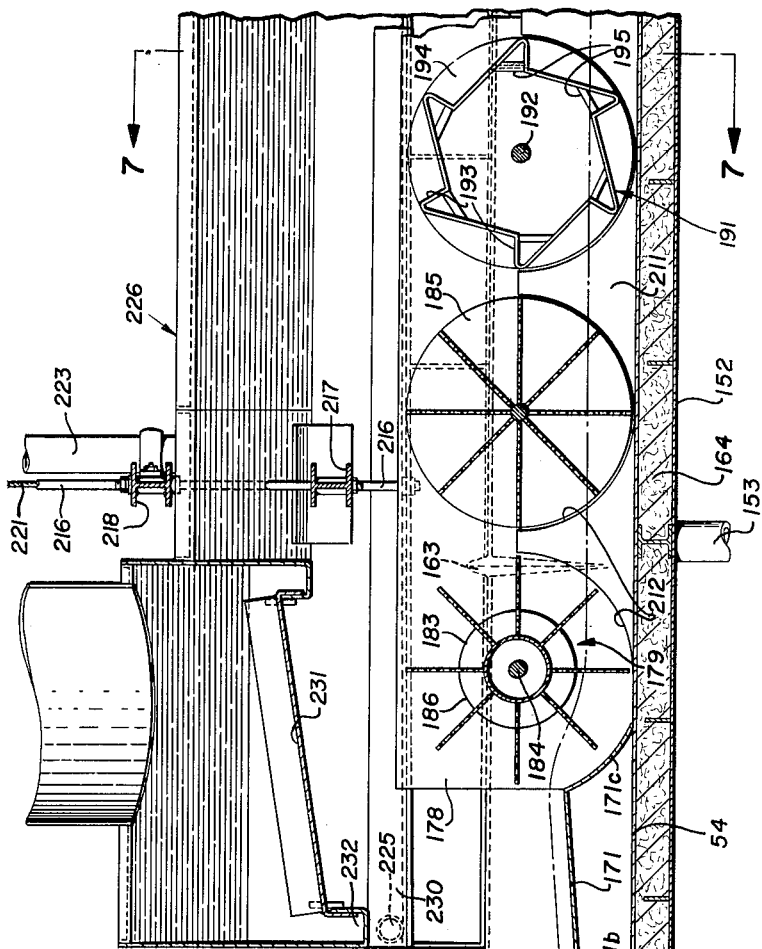
Fig. 6
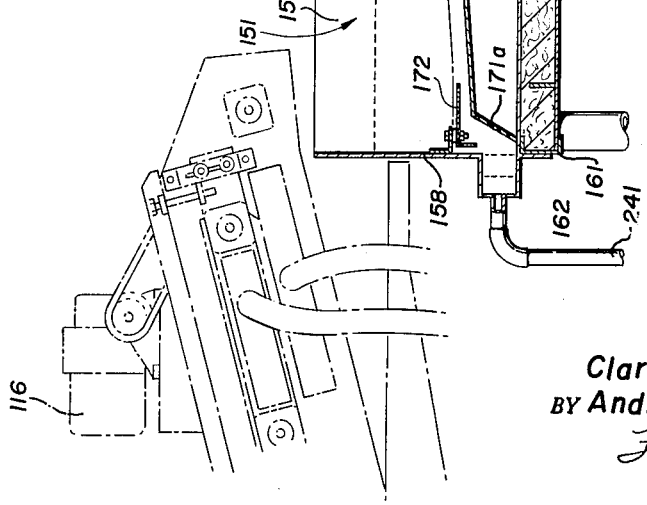
INVENTOR.
Clark K. Benson
BY Andrew A. Caridis
Attorneys Dec. 14, 1965 C. K. BENSON ETAL 3,223,024
FOOD WASHING AND COOKING APPARATUS
Filed Jan. 23, 1961 13 Sheets-Sheet 5

INVENTOR.
Clark K. Benson
BY Andrew A. Caridis
Attorneys

INVENTOR.
Clark K. Benson
BY Andrew A. Caridis
Attorneys

INVENTOR.
Clark K. Benson
BY Andrew A. Caridis
Attorneys

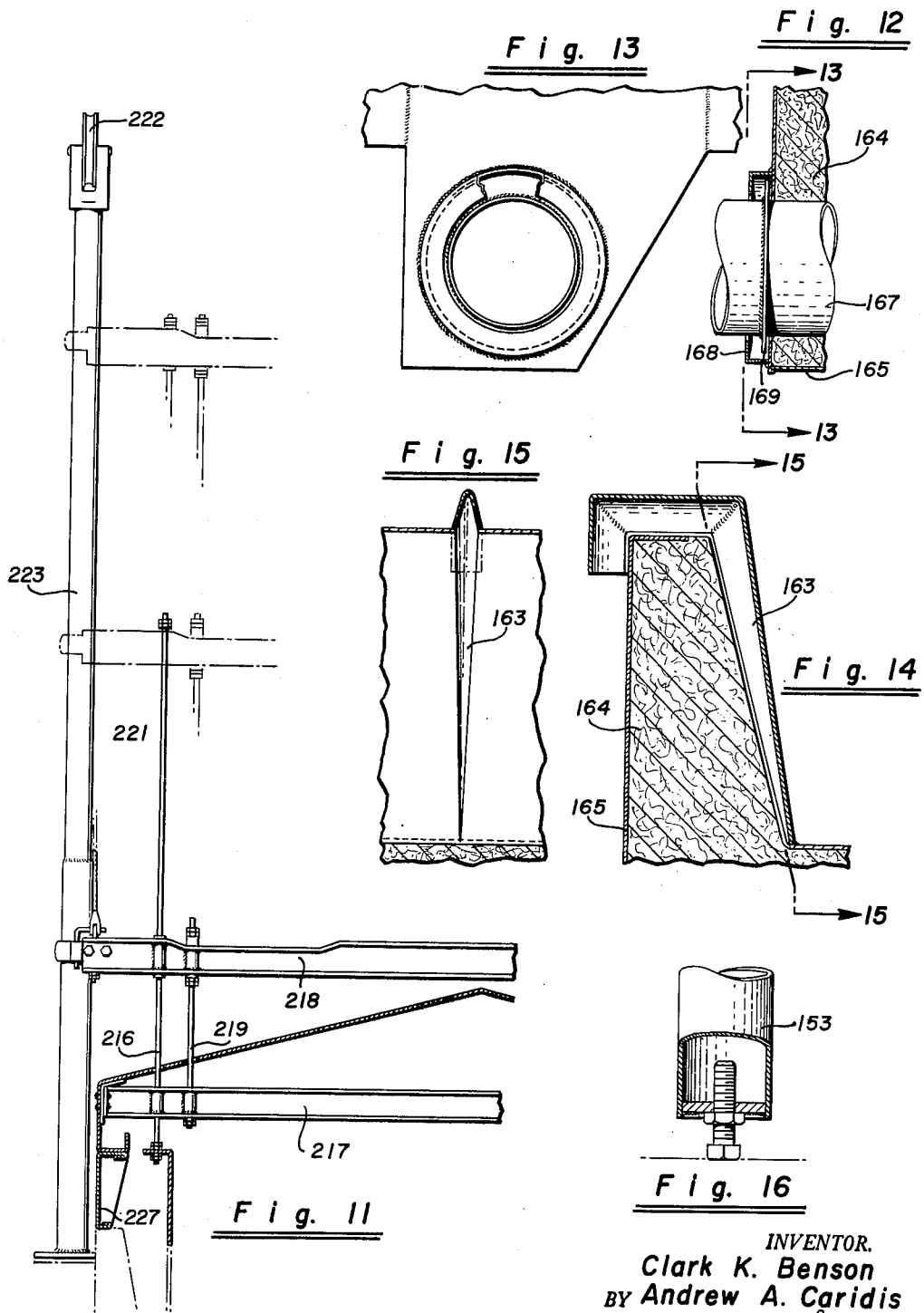

Dec. 14, 1965   C. K. BENSON ETAL   3,223,024
FOOD WASHING AND COOKING APPARATUS
Filed Jan. 23, 1961   13 Sheets-Sheet 9
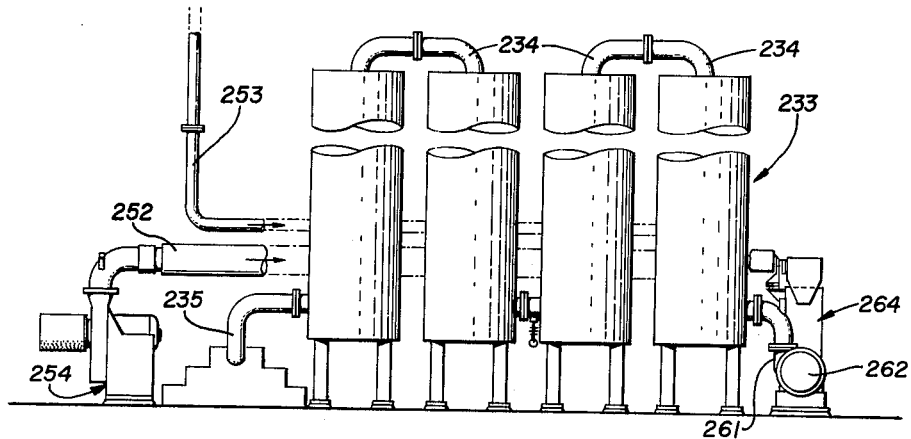
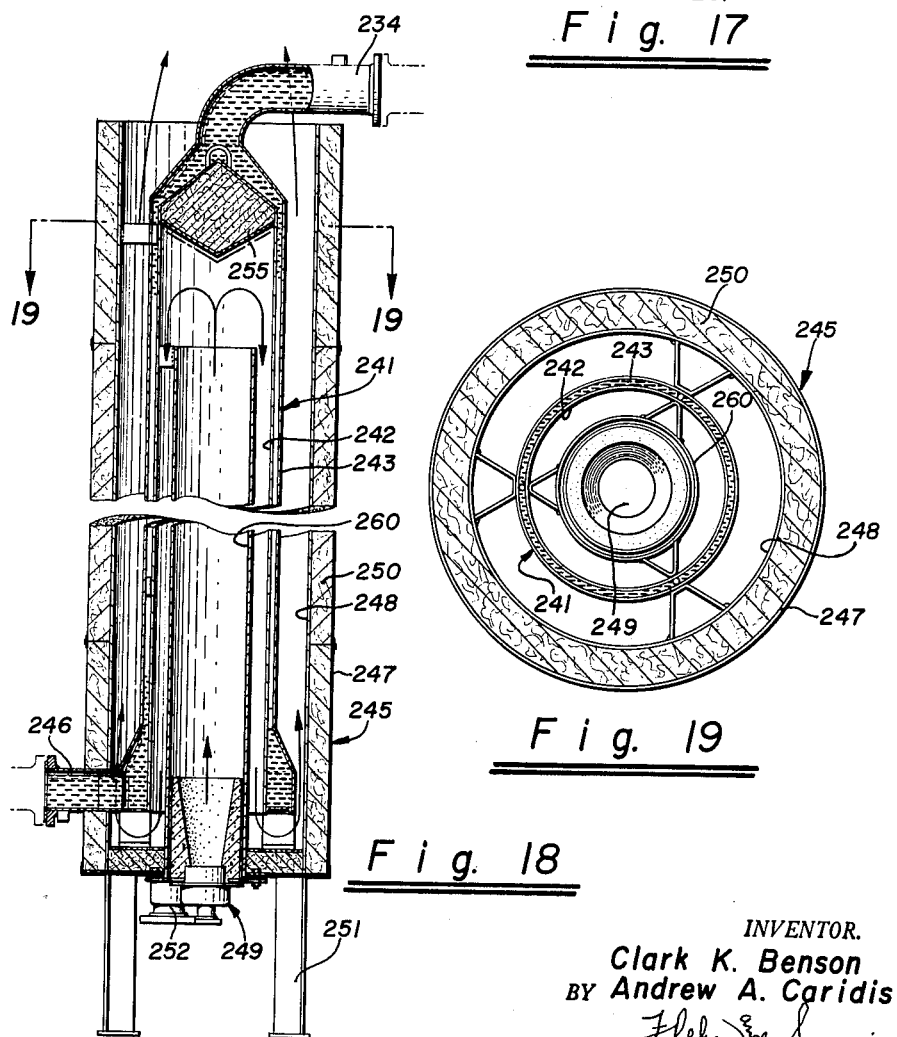
INVENTOR.
Clark K. Benson
BY Andrew A. Caridis
Attorneys

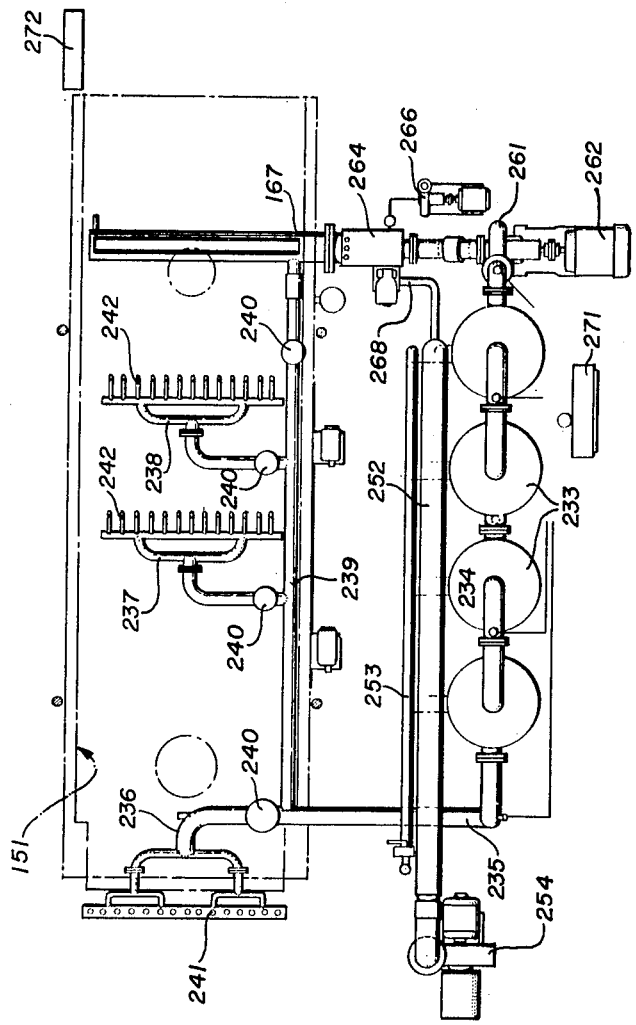

Dec. 14, 1965 C. K. BENSON ETAL 3,223,024
FOOD WASHING AND COOKING APPARATUS
Filed Jan. 23, 1961 13 Sheets-Sheet 11

INVENTOR.
Clark K. Benson
BY Andrew A. Caridis
Attorneys

Dec. 14, 1965    C. K. BENSON ETAL    3,223,024
FOOD WASHING AND COOKING APPARATUS
Filed Jan. 23, 1961    13 Sheets-Sheet 12

INVENTOR.
Clark K. Benson
BY Andrew A. Caridis

Flehr & Swain
Attorneys

Dec. 14, 1965  C. K. BENSON ETAL  3,223,024
FOOD WASHING AND COOKING APPARATUS
Filed Jan. 23, 1961  13 Sheets-Sheet 13

INVENTOR.
Clark K. Benson
BY Andrew A. Caridis

Fletcher & Swain
Attorneys

United States Patent Office

3,223,024
Patented Dec. 14, 1965

3,223,024
FOOD WASHING AND COOKING APPARATUS
Clark K. Benson and Andrew A. Caridis, Millbrae, Calif., assignors to Heat and Control, Inc., San Francisco, Calif., a corporation of California
Filed Jan. 23, 1961, Ser. No. 84,265
8 Claims. (Cl. 99—352)

This invention relates to food washing and cooking apparatus, and more particularly to a food washing and cooking apparatus suitable for the washing and cooking of potato chips.

Food washing and cooking apparatus heretofore provided for the washing and cooking of potato chips has not been particularly satisfactory. The washing of the potato chips, in some cases, has been inadequate as has been the removal of the water from the potato chips before the cooking operation. In the cooking apparatus heretofore utilized, there is no positive control of the chip movement. This, in part, has been due to the fact that multiple chains and sprockets have been utilized for driving the drums which cause irregular start and stop action of the paddle wheels or drums to irregular movement of the potato chips. In addition, there has been considerable side to side movement of the potato chips between the paddle wheels or drums and slippage of the potato chips beneath the paddle wheels or drums so that some of the potato chips become too dark or burned. It is for these and other reasons that it has been difficult to obtain a uniform product having a uniform color with uniform moisture and oil content with the apparatus presently on the market. There is, therefore, a need for a new and improved food washing and cooking apparatus.

In general, it is an object of the present invention to provide food washing and cooking apparatus in which it is possible to obtain a food product having a uniform color with uniform moisture and oil content.

Another object of the invention is to provide food washing and cooking apparatus of the above character in which a food product such as potato slices can be thoroughly washed by spraying and immersion.

Another object of the invention is to provide a food washing and cooking apparatus of the above character in which the potato slices are passed uniformly through the spraying and immersion operations.

Another object of the invention is to provide a food washing and cooking apparatus of the above character in which the potato slices are spread uniformly across a spreader tank.

Another object of the invention is to provide a food washing and cooking apparatus of the above character in which high pressure sprays are utilized for washing the potato slices and for removing the starch from the potato slices.

Another object of the invention is to provide a food washing and cooking apparatus of the above character in which small slivers and the like are readily eliminated from the potato slices.

Another object of the invention is to provide a food washing and cooking apparatus of the above character in which spreading of the potato slices is facilitated by the use of a counter-rotating drum.

Another object of the invention is to provide a food washing and cooking apparatus of the above character in which constantly circulating water is utilized in the spreading tank to facilitate spreading and uniform passage of the potato slices.

Another object of the invention is to provide a food washing and cooking apparatus of the above character in which a uniform flow of washed potato slices is supplied to the cooker.

Another object of the invention is to provide a food washing and cooking apparatus of the above character in which the potato slices are continuously and positively advanced in the cooking oil.

Another object of the invention is to provide a food washing and cooking apparatus of the above character in which the potato chips are advanced in channels to prevent sidewise drifting.

Another object of the invention is to provide a food washing and cooking apparatus of the above character in which the speed of movement of the chips through the cooker is controlled by the flow of oil in the cooker and by the rate of rotation of the drums in the cooker.

Another object of the invention is to provide a food washing and cooking apparatus of the above character in which the speed of movement of the potato chips in one part of the cooker can be changed so that it is different from the speed of movement of the chips in another part of the cooker.

Another object of the invention is to provide a food washing and cooking apparatus of the above character in which oil utilized in the cooker is heated externally of the cooker by heat exchangers.

Another object of the invention is to provide a food washing and cooking apparatus of the above character in which there is uniform oil flow through the cooker.

Another object of the invention is to provide a food washing and cooking apparatus of the above character in which the oil is introduced into the intake of the cooker in a flat stream of oil extending the width of the cooker.

Another object of the invention is to provide a food washing and cooking apparatus of the above character in which oil is introduced into other portions of the cooker to maintain a relatively constant oil temperature in the cooker and to also control the discharge temperature of the oil from the cooker.

Another object of the invention is to provide a food washing and cooking apparatus of the above character in which means is provided to accommodate the difference in expansion between the top and bottom of the cooker so as to maintain the bottom wall of the cooker flat at all times.

Another object of the invention is to provide a food washing and cooking apparatus of the above character in which the drums of the cooker are assembled on a single frame unit.

Another object of the invention is to provide a food washing and cooking apparatus of the above character in which the hood and the frame carrying the drums can be raised.

Another object of the invention is to provide a food washing and cooking apparatus of the above character in which the hood can be raised above the frame carrying the drums for inspection purposes.

Another object of the invention is to provide a food washing and cooking apparatus of the above character in which the hood and the frame carrying the drums can be raised for cleaning of the cooker.

Another object of the invention is to provide a food washing and cooking apparatus of the above character in which the take-out conveyor for the cooker is hinged to the frame carrying the drums to facilitate cleaning of the cooker.

Another object of the invention is to provide a food washing and cooking apparatus of the above character in which the drums are spaced relatively close to the bottom of the cooker to prevent slippage of potato chips.

Another object of the invention is to provide a food washing and cooking apparatus of the above character in which the drums are provided with vents to vent steam released from the potato chips during the cooking operation.

Another object of the invention is to provide a food washing and cooking apparatus of the above character which can be readily controlled.

Another object of the invention is to provide a food washing and cooking apparatus of the above character which can be automatically controlled and which will provide uniform results upon repeated start-ups.

Another object of the invention is to provide a food washing and cooking apparatus of the above character which will not be adversely affected by power failures or forced shut-downs.

Additional objects and features of the invention will appear from the following description in which the preferred embodiment has been set forth in detail in conjunction with the accompanying drawings.

Referring to the drawings:

FIGURES 1A, 1B and 1C are side elevational views, partially in cross-section, showing a food washing and cooking apparatus incorporating the present invention.

FIGURE 2 is an enlarged detail view, partially in cross-section, showing the reel washer and associated apparatus.

FIGURE 3 is a cross-sectional view of the reel washer taken along the line 3—3 of FIGURE 2.

FIGURE 4 is an enlarged side elevational view, partially in cross-section, of the spreader and the discharge belt including the water removing assembly.

FIGURE 5 is an enlarged side elevational view with certain parts broken away showing the water removing assembly.

FIGURE 6 is a side elevational view, partially in cross-section, showing the front portion of the cooker.

FIGURE 11 is a detail view showing a portion of the means for raising and lowering the hood and frame of the cooker.

FIGURE 12 is a partial enlarged view of the oil discharge duct from the cooker.

FIGURE 13 is a cross-sectional view taken along the line 13—13 of FIGURE 12.

FIGURE 14 is a cross-sectional view of one of the expansion joints utilized in the cooker kettle or vat.

FIGURE 15 is a cross-sectional view taken along the line 15—15 of FIGURE 14.

FIGURE 16 is a view partially in cross-section showing one of the adjustable legs used on the cooker.

FIGURE 17 is a side elevational view of the heat exchangers utilized for the cooker.

FIGURE 18 is a side elevational view in cross-section showing one of the heat exchangers.

FIGURE 19 is a cross-sectional view taken along the line 19—19 of FIGURE 18.

FIGURE 20 is a top plan view of the heat exchangers and shows the means for introducing the oil into the cooker.

Figure 7:
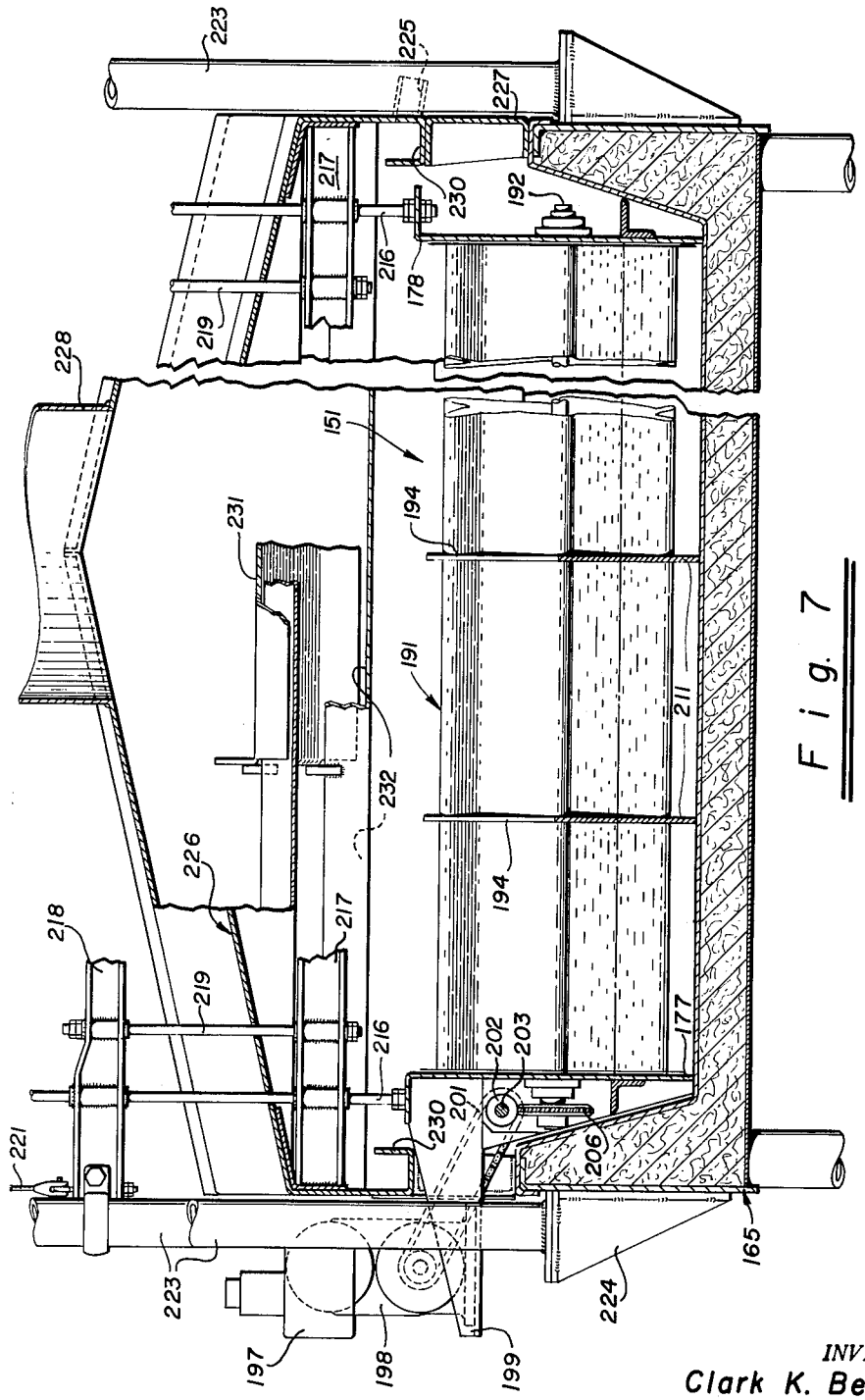
FIGURE 7 is a cross-sectional view of the cooker taken along the line 7—7 of FIGURE 6.
Figure 8:
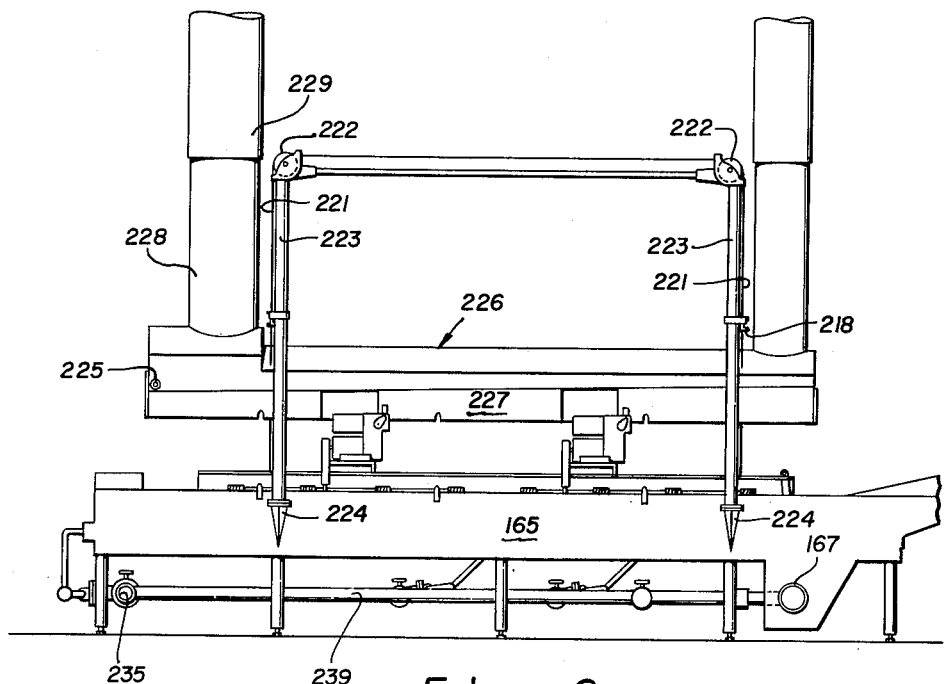
FIGURE 8 is an enlarged detail view of the cooker showing the hood in a raised position.

In general, the present invention consists of a standard feed conveyor which supplies a uniform flow of peeled potatoes to a slicer 12. The feed conveyor 11 and the slicer 12 are of conventional construction and are of a type well known to those skilled in the art. The potato slices from the slicer 12 are supplied to a reel washer 13 where they are thoroughly washed. The reel washer supplies the slices to a spreader 14 which spreads them across a relatively wide area and onto a discharge belt assembly 16 which removes the slices from the spreader. Means 17 is provided on the discharge belt assembly for removing excess surface water from the slices before they are dropped into a cooker 18. The slices are advanced through the cooker 18 in channels to prevent substantial sidewise movement of the slices in the cooker. The cooked slices or potato chips are elevated out of the cooker by a take-out belt assembly 19 which supplies the chips to a salter belt assembly 21. The salter belt assembly supplies the product to a dividing chute assembly 22 which deposits the product upon inspection belts 23.

*Reel washer*

Since the feed conveyor 11 and the slicer 12 are conventional, they will not be described in detail. The reel washer 13 consists of a reel 24 formed of a large cylindrical screen 26 which is provided with end caps 27 and 28. The end cap 27 is provided with an opening 29 which serves as an inlet opening for the reel type washer, whereas the end cap 28 is provided with an opening 31 which serves as a discharge opening for the washer. The end cap 28 is also perforated for a reason hereinafter described. A plurality of helical flights or vanes 32 are mounted on the inner surface of the cylindrical screen 26 and are inclined in a forward direction as shown particularly in FIGURE 2. A plurality of U-shaped perforated buckets 33 are mounted on the end cap 28 and face toward the opening 31.

The reel 24 is rotatably mounted in a tank 36. The tank 36 is supported by a rigid steel framework 37 and is provided with two inwardly inclined bottom walls 38 and 39 which also incline downwardly towards one side of the tank to a swivel drain connection 41. Rotatable support means is provided for rotating the drum and includes a pair of support rollers 42 and 43 at each end of the reel of a suitable type such as rubber tired rollers which engage the end caps 27 and 28. The rollers 42 and 43 are carried by shafts 46 rotatably journaled in the framework 37 and driven at a substantially constant speed by suitable means such as gear motor 47 mounted on the framework 37 and driving a pair of belts 48 and 49, driving pulleys 51 and 52 mounted on the shafts 46. A pair of guide rollers 53 and 54 is mounted on opposite ends of the frame 37 and serve to maintain the reel in a predetermined position longitudinally of the tank 36.

The slicer 12 drops potato slices into a chute 56 mounted upon the framework 37 and having its forward end disposed within the opening 29 of the reel 24. A water spray is provided from a pipe 58 for washing the slices from the chute 56 into the intake end of the reel 24. A discharge trough 58 is also mounted on the framework 37 and has its inlet end disposed in the opening 31 in the reel and has a large relatively flat surface which is adapted to receive the potato slices as they are raised by the buckets 33 and dropped into the trough 58. A pair of nozzles 59 is provided on opposite sides of the trough 58 and provide flat sprays which wash down the sides of the troughs and prevent the potato slices from creeping up the side walls of the trough. An additional nozzle 61 is mounted on the intake end of the trough 58 and also serves to wash the potato chip slices down the trough. A deflector plate 62 is mounted on the forward end of the trough 58 and serves to deflect the slices downwardly. It prevents the slices from sliding in between the vanes of the counter-rotating paddle in the spreader hereinafter described.

A high pressure water spray is introduced on one side of the reel to push the slices off the reel and tumble them back into the water in the tank 36. This is accomplished by means of a plurality of flat spray nozzles 66 provided on a water manifold 67 extending longitudinally of the reel 24. As can be seen particularly from FIGURE 3, the flat spray impinges upon the screen and serves to push the slices off of the screen and to fold or roll them back into the water after they have been raised out of the water by the reel. In this manner, a folding or churning action of the slices is obtained which assures separation of the slices and at the same time achieves uniform washing of all the slices.

Means is provided for maintaining a predetermined water level within the tank 36 and consists of an adjustable weir placed in an opening 71 in the tank 36. A drain box 72 is mounted on the side of the tank and is provided with a drain connection 73. A nozzle 74 is used to provide a high velocity spray which is used for breaking up the foam which collects within the drain box 72.

Operation of the reel washer may now be briefly described as follows. As the slices drop out from the bottom of the slicer 12, they are washed down the chute 56 by the high velocity spray from the nozzles 60 so that they are deposited in the intake end of the reel 24. The reel during this time is driven continuously in one direction at a relatively constant speed with the water level at a level indicated by the line 76. Rotation of the reel is in a clockwise direction as viewed in FIGURE 3. Shortly after the slices are introduced into the reel from the chute 56 and are raised out of the water by the reel, the slices come into contact with the high velocity water streams from the flat spray nozzles 66 which roll the potato slices off of the reel and back into the water to create a churning action. As the slices are rolled off, a certain number of slices will fall into the next flight. Thus, as the potato chips are washed off of the side walls of the screen, they will be progressively dropped into successive flights so that they will be advanced toward the discharge end of the reel.

There is a continuous flow of water through the bottom portion of the reel so that some of the chips may be carried forward by the water towards the buckets 33. As explained previously, the buckets 33 are perforated as is the end cap 28 so that there is a flow of water toward the end cap 28 to assure a uniform flow of slices into the buckets. Also because of this flow of water, the slices will stay in the buckets as they are raised out of the water by rotation of the reel. Continued rotation of the reel causes the chips to slide off of the buckets and into the discharge trough 58. The slices are then washed out of the trough by the jets of water from the nozzles 59 and deposited in the spreader in a constant uniform manner.

The screen 26 has openings of sufficient size so that slivers from the potato chips drop into the bottom of the tank and eventually are collected and passed down through the swivel drain 41. The foam which arises from the washing operation is urged by the rotation of the reel towards the openings 71 over the weir 69 into the drain box 72. The foam is then broken up by the spray from the nozzle 74 and washed down the drain 73.

Spreader

As explained previously, the potato chip slices are deposited from the reel washer 13 into the spreader 14. The spreader 14 consists of a framework 81 provided with means for adjusting the height of the same as shown particularly in FIGURE 4. A tank 82 is mounted on the framework and is provided with a bottom wall having two levels 83 and 84. The forward end of the tank is provided with an adjustable weir 86 which extends across the entire width of the tank so that there is a uniform flow of water from all portions of the forward end of the tank. The water flows into a drain box 87 also extending the width of the tank. The drain box is connected by piping 88 to the drain line. A screen 85 is provided in the drain box 87 to remove any small particles from the water. The pump is connected to a water supply pipe 90 and supplies a distributing manifold 91 connected to the pump 89 by piping 92 through a main control valve 93. A plurality of manifold outlets 94 rising vertically from the distributing manifold feed the rear end of the tank 82. Each of the manifold outlets is provided with a valve 96 so that the flow of water in the intake end of the tank 82 can be controlled. The manifold outlets 94 are arranged across the width of the tank so that water is introduced across the entire width of the tank from the plurality of manifold outlets. The weir 86 is adjusted so that the water level is maintained in the tank 82 at the level indicated by the line 85.

A pair of paddle wheels 97 and 98 are rotatably mounted in the side walls of the tank and are provided with a plurality of equally spaced radially extending vanes 101. Means is provided for rotating the paddle wheel 97 in a counter-clockwise direction or in a direction which is counter to the water flow in the tank and the other paddle wheel 98 in a counter-clockwise direction or in the same direction as the flow of water in the tank. This means consists of a gear motor 102 mounted on the framework 81 and driving a chain 103 which is reeved over an idler sprocket 104, under a sprocket 106 for the paddle wheel 97, over an idler sprocket 107 and over a sprocket 108 for the paddle wheel 98.

Operation of the spreader may now be briefly described as follows. As the water is introduced uniformly across the intake end of the tank 82, the water is backed up against the intake end of the tank by a counter-rotating paddle 97 to provide a pool of water between the paddle wheel 97 and the intake end of the tank for receipt of the potato slices as they drop from the trough 58. This rather turbulent pool of water immediately behind the paddle wheel 97 causes the slices to spread out uniformly across the full width of the spreader tank.

It, however, will be noted that the paddle wheels 97 and 98 are positioned in such a manner that they are spaced a substantial distance above the bottom wall 83 of the tank. Because of the flow of the water from the intake end towards the discharge end of the tank, water will flow under the paddle wheels and carry potato slices with it. Because the slices go under the paddle wheel 97, they are again encouraged to distribute themselves uniformly across the width of the tank.

The forward rotation of the paddle wheel 98 causes the potato slices with the water to be urged forward uniformly in a wave-like action onto the discharge belt assembly 16. The water passes through the belt and over the weir 86 so that it can be recirculated. The screen 85 at the top of the drain box serves to separate out slivers and any other foreign objects which may be in the water and cause damage to the pump 89.

Discharge belt assembly

As explained above, the potato slices are urged onto the discharge belt of the discharge belt assembly by the paddle wheel 98 in the spreader tank. The discharge belt assembly consists of a discharge belt 111 of conventional construction such as stainless steel mesh of rather large size and is mounted on a pair of roller assemblies 112 and 113 rotatably mounted in a frame 114. The roller assemblies include sprockets (not shown) which drive roller chain edges provided on the sides of the mesh to provide a positive drive without slippage. The roller assembly 113 is driven by gear motor 116 mounted on the frame 114. The output sprocket 117 of the gear motor 116 drives a chain 118 reeved over sprocket 119 fixed to the roller assembly 113.

The frame 114 is supported by four posts 121 which are provided with adjustment means 122 as shown in FIGURES 4 and 5. The upper ends of the posts 121 are joined by a cross member (not shown). Means is provided for raising and lowering the discharge belt assembly and consists of cables 124 which are reeved over sheaves (not shown) carried by the posts and having their ends attached to the frame as shown in the drawing and to a hand operated winch 126.

Support means is provided for supporting the discharge belt assembly in a lowered position as shown in FIGURE 4 in the form of support legs 128 secured to the frame 114 and adapted to rest upon the inclined portion 80 of the tank 82. A seal plate 129 is mounted on the lower end of the discharge belt and rests upon the bottom wall 83 of the tank 82 when the discharge belt assembly is in its lowermost position as shown in FIGURE 4. The seal plate extends across the entire width of the tank and serves to prevent potato slices from passing between the bottom of the tank and the lowermost end of the discharge belt.

The discharge belt assembly, as is apparent, merely serves to lift the potato slices out of the water in the tank 82, and to deposit them into the cooker as hereinafter described. Water is being continuously added to the tank 82 by a plurality of nozzles 131 which provide flat pattern sprays that serve to wash off any starch which collects on the discharge belt. At the same time the sprays wash off any starch or foam from the potato slices as they are elevated by the discharge belt from the water in the tank. Sprays are provided also on the sides of the frame to prevent the collection of starch and foam on the side members forming the frame 114.

*Means for removing excess moisture*

Means 17 is provided for removing the excess moisture from the potato slices as they are advanced by the discharge belt. This means consists of a plurality of wiper assemblies 136 disposed transversely across the width of the discharge belt 111. Each wiper assembly consists of resilient blade-like members 137 which engage the bottom sides of the upper run of the discharge belt 111 to knock off the droplets of water that cling to the belt as it is advanced out of the water. The blade-like members are supported by blocks 138 mounted upon the frame 114. At the upper end of the discharge belt, means is provided for removing excess moisture from the potato slices themselves in the form of air wiping means. It consists of a plurality of pipes 142 mounted below the upper run of the discharge belt 111 and a plurality of pipe 141 mounted above the upper run of the discharge belt 111. The pipes 141 and 142 are provided with openings or slits 143 which direct high velocity jet streams of air at an angle so that they impinge upon the bottom and top surfaces of the potato slices and drive the excess surface water therefrom. A separate hold-down belt 146 is provided which is mounted upon sprockets 147 and driven by a main sprocket 148 engaging the chain 118. The hold-down belt serves to hold the potato slices down while the high velocity jet streams are impinging upon them. Air is supplied to the pipes 141 and 142 by air hoses 149 and 151 connected to a suitable source of air pressure such as air under a pressure of 16 ounces per square inch.

The direction of the jets of air from the pipes 141 and 142 is such that the water from the chips is pushed back toward the spreader tank so that the potato slices are as dry as possible before they are dropped into the cooker.

It is desirable to remove the surface water from the potato slices so as to lessen the load on the heating system for the cooker, and also to reduce the amount of boil in the cooker.

As shown particularly in FIGURE 5, means is provided for adjusting the vertical position of the hold-down belt with respect to the discharge belt to ensure that the slices will stay in position when they encounter the high velocity air jets.

The discharge belt assembly, when raised, is maintained in the same angular position as shown in FIGURE 4.

*The cooker*

The cooker consists of a vat or kettle 151 which is mounted on a framework 152 which includes a plurality of vertical legs 153 which are adjustable in height as shown. The vat 151 is provided with a bottom wall 154, side walls 156 and 157, and end walls 158 and 159. The bottom wall 154 is substantially flat as shown and rests upon the framework 152. The bottom wall of the tank is provided with depending portions 161 which are secured to the framework 152 by loosely fitting bolts (not shown) which accommodate the expansion and contraction of the vat or kettle during heating and cooling of the same. These bolts serve to keep the ends of the vat or kettle in position and prevent the ends from lifting above the framework.

There is a tendency of the vat to bow because the bottom wall 154 of the vat is normally at a higher temperature than the top portions of the side walls. In other words, there is a differential in temperature which has a tendency to cause bowing of the vat. To prevent this bowing, a plurality of tapered expansion joints 163 have been provided in the side walls 156 and 157 of the vat. A detail of these expansion joints is shown in FIGURES 14 and 15 and, as shown, each of the expansion joints consists of V-shaped portions which are of a lighter gauge than the gauge utilized for the vat. These V-shaped portions gradually increase in width towards the top of the vat to accommodate the smaller amount of expansion and contraction which occurs at the top portions of the side walls of the vat. The vat 151, as shown, is provided with suitable insulation 164 surrounding the side walls and the bottom wall of the vat or kettle and enclosed by a casing 165.

The bottom wall of the cooker has a drain section 166 which is provided with a drain pipe 167 that is shown particularly in FIGURES 12 and 13. The drain pipe is welded to the cooker or vat 151 and passes through the insulation 164 in the casing 165. An outer cover plate 168 is provided on the casing and cooperates with a flange 169 on the pipe 167 to prevent water from entering into the insulation 164 in the casing.

An end plate 171 is mounted on the bottom wall of the rear portion of the vat or cooker 151 and is formed in such a manner that it has an upwardly inclined portion 171a which directs the oil upwardly as hereinafter described and discharges the same onto a flat upwardly inclined portion 171b to provide a flat oil pattern which is gradually elevating as it moves into the cooker. The plate 171 is also provided with an arcuate portion 171c which accommodates the first drum as hereinafter described. A baffle 172 is mounted on the forward wall 158 of the vat and serves to urge the oil downwardly onto the inclined portion 171b after it has been urged upwardly by the portion 171a of the bottom wall plate (see FIGURE 6).

A drum assembly 176 is normally disposed within the vat and is comprised of a framework consisting of side plate members 177 and 178 in which are rotatably mounted a plurality of drums. A plurality of drums 179 are mounted on the forward section of the vat. Each drum is provided with a plurality of perforated paddles or vanes 181 secured to a cylinder 183 mounted on a shaft 184. A plurality of circular dividers 185 are mounted on each of the drums and serve to provide channels as hereinafter described. The drums are provided with spacers 186 to prevent the potato chips from coming in too close and becoming lodged in the center of the drum.

A plurality of additional drums 191 are mounted in the vat on the side member 177. The drums 191 are mounted on shafts 192 rotatably journalled in the side members. The drums 191 are provided with a plurality of steps 193 extending axially of the drum and dividers 194 spaced longitudinally of the drum. Tubes or pipes 195 are provided in the steps for releasing steam from the potato slices as hereinafter described.

The drums 179 and 191 are divided into two groups of four. Each of the groups is driven by remotely controlled variable speed means consisting of a constant speed motor 197 which drives a variable speed unit 198 mounted on a bracket 199 carried by the side frame 177 and 178. The speed reducer unit 198 drives a sprocket chain 201 which drives a sprocket 202 mounted on a worm shaft 203. A plurality of worms 204 are affixed to the shaft and drive spur gears 206 mounted on the shafts 184 and 192.

It is readily apparent that with such a variable speed drive means, the two separate groups of drums may be driven at different speeds for a purpose hereinafter described.

A plurality of baffles 211 are mounted on the bottom wall of the vat 151 and serve to divide the vat into a plurality of lanes or channels extending longitudinally of the vat. The baffles 211 are provided with a plurality of substantially semi-circular recesses 212 to accommodate the drums 191 and 179. The divider plates 194 on the drums 191 and the divider plates 185 on the drums 179 are in alignment with the baffles 211 and serve to prevent substantial drifting of the potato chips from side to side within the kettle during the cooking operation as hereinafter described.

The side frame members 177 and 178 forming a portion of the drum assembly 176 are fastened to a plurality of vertical rods 216 and which extend through spaced crossed I-beams 217. The rods 216 also extend through additional cross I-beam members 218. The two sets of I-beam members 217 and 218 are connected by a plurality of vertical rods 219. Hoisting cables 221 are connected to the cross beams 218 and are reeved over sheaves 222 carried by vertical posts 223 mounted on brackets 224 provided on the sides of the casing 165. The cables are adapted to be raised by a reversible winch unit (not shown) similar to that described in Patent No. 2,833,203.

A hood 226 generally overlies the vat and is supported upon the cross members 217 shown particularly in FIGURES 7 and 11. The hood 226 is provided with a portion which extends below the cross members 217 and which is secured to side frame members 227 which are adapted to rest upon the top wall of the cooker or vat as shown particularly in FIGURE 7. The hood 216 vents into a pair of vent pipes or stacks 228 which telescope into pipes 229 mounted in the roof of the building in which the washing and cooking apparatus is located. The hood is formed with drain channels 230 which slope downwardly to a drain pipe 225. A pan 231 is provided below each of the stacks 228. Each pan slopes into a drain channel 232 which drains into one of the channels 230. These channels serve to collect condensed greases and oils and prevent them from dropping into the vat.

Oil for the cooker comes from an external heat exchanger system which consists of a plurality of vertical heat exchangers 233 connected by pipes 234 and having an outlet pipe 235 which supplies directly a manifold 236 and two additional manifolds 237 and 238 through a feeder pipe 239 and which is also connected to the drain pipe 167. A plurality of valves 240 are provided in this piping to control the flow of oil as hereinafter described. As can be seen particularly from FIGURE 20, oil is supplied to the vat 151 at three different points. Oil is primarily supplied to the intake end or rear end of the vat by the manifold 236 through a plurality of manifold outlet pipes 241 connected to the inlet end of the vat as shown particularly in FIGURE 6. Heated oil from the heat exchangers is also introduced through the manifolds 237 and 238 through inclined pipes 242 entering the bottom wall of the vessel or vat. The control valves 240 are provided for dividing the flow of oil into the three points into the vat.

The heat exchangers 233 are shown particularly in FIGURES 18 and 19 and consist of an outer housing or casing 245 which consists of outer and inner walls 247 and 248 filled with insulation 250. The oil is carried in the heat exchanger by a cylindrical member 241 in the form of an annulus having inner and outer walls 242 and 243. The upper end of the cylindrical member 241 terminates in a pipe section 234, and the lower end terminates in a pipe section 246. An insulated plug 255 is mounted in the top portion of the cylindrical member and is provided to prevent overheating of the oil at this point. A firing tube 260 is disposed within the cylindrical member 241 and has a nozzle-type burner 249 mounted in its lower end. The heat exchanger is supported by a plurality of legs 251.

The burners 249 for the heat exchangers are supplied with air from the pipe 252 and gas from the pipe 253. The air is supplied under pressure to the pipe 252 by the air compressor 254.

The products of combustion of the burner 249 rise up the firing tube 260 and are discharged at the upper end as shown by the arrows and return over the outside of the firing tube in contact with the inner wall of the cylindrical member 241. The hot combustion gases pass down the passage between the firing tube and the annulus containing the oil and then upwardly again as shown by the arrows in FIGURE 18 in contact with the outer wall of the annulus type heat exchanger. The gases are then exhausted to the stack 256. In the first stage that is with respect to the inner wall of the annulus section, heating is by radiation and by convection of the hot gases over the inner wall of the annulus. On the outside wall of the annulus, heating is by convection of the hot gases over the outer wall plus radiation from the outer shell or casing of the unit which is preferably of a reflective type of material such as polished aluminum.

After the gases have passed through the heat exchanger, the gases are vented up through the stack 256, while at the same time picking up air through the space 257 provided between the stack and the heat exchanger to cool the gases down sufficiently so that they can be safely emitted from the building in which the entire assembly is located.

The heat exchanger unit has been well insulated so that there is a minimum surface heat loss. The unit is also very efficient because of the ample surface provided for transferring of heat to the oil.

During operation, oil is continuously pumped through the heat exchangers by a pump 261 driven by a motor 262. The pump 261 takes oil after it has been passed through a catch box 264 described in our copending application Serial No. 84,226, filed January 23, 1961. As shown particularly in FIGURE 20, the catch box is connected to the drain pipe 167.

In FIGURE 20, a small pump 266 is shown which can be utilized for transferring oil to and from the cooker system. Thus, by use of the pump 266, the oil can be pushed through a filter or oil can be removed, or new oil placed in the system by the use of this pump. An air pipe 268 is provided for supplying air to the catch box for a purpose described in that copending application.

A pair of control panels 271 and 272 provided with numerous controls and other devices for making possible automatic control of the cooker system are utilized. However, since the use of such controls is conventional, they will not be described in detail.

Operation of the cooker may now be briefly described as follows. The oil is supplied to the heat exchangers 233 by the pump 261. The oil is first urged upwardly through the first heat exchanger, down the second, up the third, down through the fourth, and out through the discharge pipe 235. The heating rates for the heat exchangers are automatically controlled so that the temperature of the oil discharged into the pipe 235 is at a desired temperature. The actual temperature rise through the four heat exchanger towers may, for example, be 30° F.

The oil is introduced through all three of the manifolds 236, 237 and 238. As explained previously, most of the oil is introduced through the manifold 236 into the intake or feed end of the cooker so that there is a smooth even flow of oil over the bottom plate 171. The potato slices are introduced into this film of oil as shown in FIGURE 6 from the discharge belt assembly. Because of the large amount of water in the potato chips, there is a continuous boiling action occurring at the feed end of the cooker due to the release of large quantities of steam. The bottom plate 171 serves to ensure that there is no back-flow of the potato slices as they enter the cooker. The flow of the oil over this bottom plate is relatively rapid and causes the potato slices to be advanced forward into the cooker without hesitation. The potato slices are, therefore, positively advanced into the first drum or paddle wheel 179.

It should be pointed out that the raw potato slices are introduced uniformly across the entire width of the cooker and that the potato slices are maintained in this same general alignment without any substantial sidewise movement by the baffles in the cooker in cooperation with the divider plates carried by the drums themselves. The drums are rotated in a counter clockwise direction, that is, in the same direction as the flow of oil to continuously and positively advance the potato slices. The first two drums 179 are formed with perforated paddles to facilitate the release of the large amounts of steam from the potato slices as the surface water is removed by the hot oil. The speed of rotation of the drums 179 is made such that the potato chips are advanced through the cooker in such a manner that when they leave the cooker they have a proper uniform color with uniform moisture and oil content.

The additional drums 191 are constructed in a different manner because by the time the potato chips reach these drums, a substantial portion of the moisture has been removed and for that reason there is no great necessity for releasing large quantities of steam. However, pipes 195 are provided in the steps 193 to release any steam which may collect. It should be noted that the drums are placed in relatively close proximity to the bottom wall of the vat so that none of the chips can slip by and so that all of the chips are continuously advanced in lanes or channels along the vat. If desired, the two groups of drums can be operated at different speed to obtain the desired end results in the product. At the same time the quantity of oil flow through the additional manifolds 236 and 237 can be adjusted to maintain the desired temperature in the forward portions of the vat.

As the potato chips reach the end of the cooker, they are removed by the take-out conveyor assembly hereinafter described.

If it is desired to observe the cooking operation, the hood can be raised separately from the frame carrying the drums by actuating the hoist mechanism for raising the cables 221. Raising of the cables 221 first lifts the cross member 218 which carries with it the cross members 217 carrying the hood. The hood will be raised for a distance which is determined by the spacing between the two sets of cross members 217 and 218 before there will be any raising of the frame carrying the drums. This is true because the rods 216 are slidably mounted in the cross members 217 and 218.

After the cross member 217 has been raised, the cooking operation may be readily observed. It is, however, desirable that the hood normally always remain in contact with the top of the vat so that there is no escape of the heat and also so that it is easier to control the conditions within the cooker.

Figure 9:
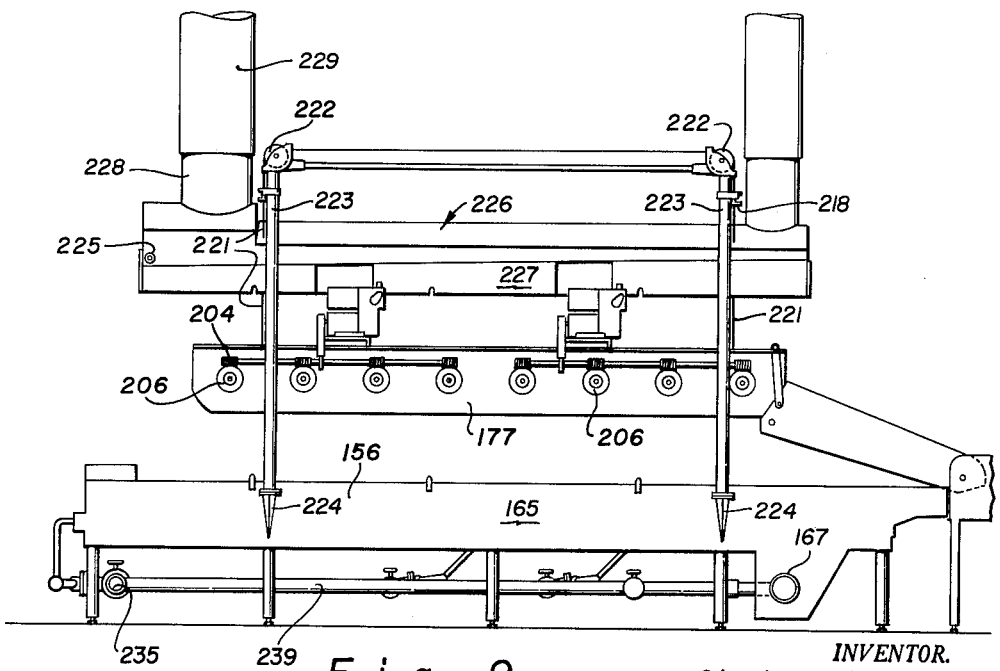
FIGURE 9 is a side elevational view of the cooker with the hood and drum carrying frame in a raised position.
Figure 10:
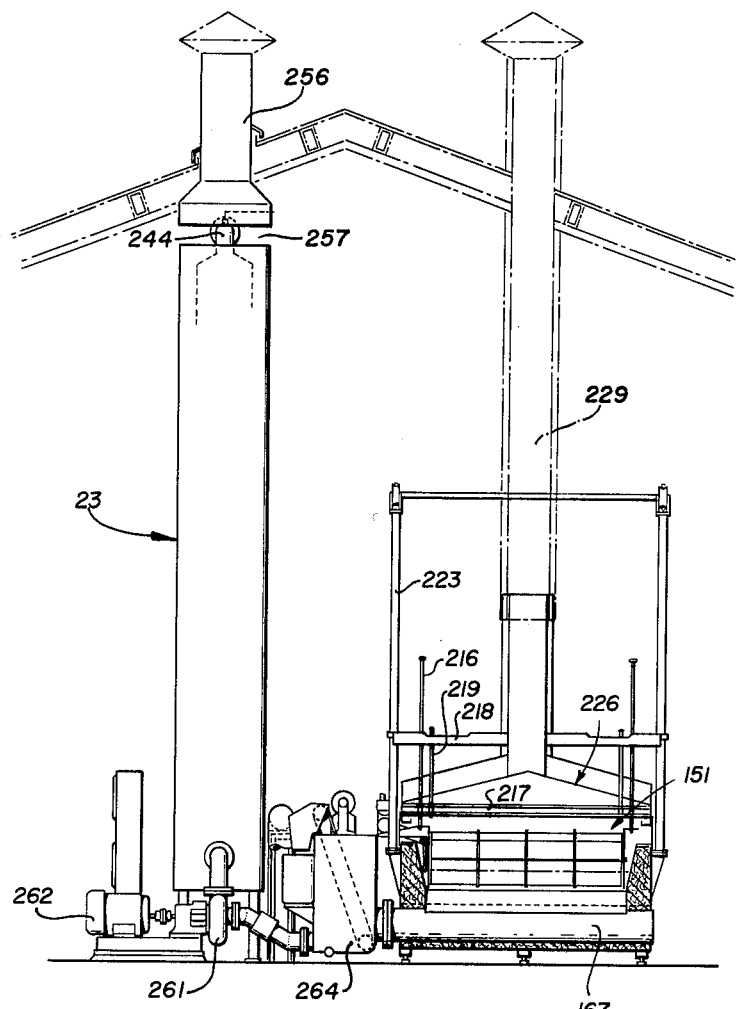
FIGURE 10 is an end elevational view, partly in cross-section, showing the washing and cooking apparatus.

If it is desired to also raise the drum carrying frame, it is merely necessary to continue raising of the cables 221. As soon as the cross members 217 come into engagement with the members 218, the hood and the drum carrying frame will be raised as a unit. This is shown particularly in FIGURE 9. In this position, the vat can be readily cleaned.

*Take-out belt assembly*

The take out belt assembly 19 consists of a first take-out belt assembly 271 and a second take out belt assembly 272 which normally runs at twice the speed of the first take-out belt assembly. The second take-out belt assembly acts as a salter belt as hereinafter described.

Figure 22:
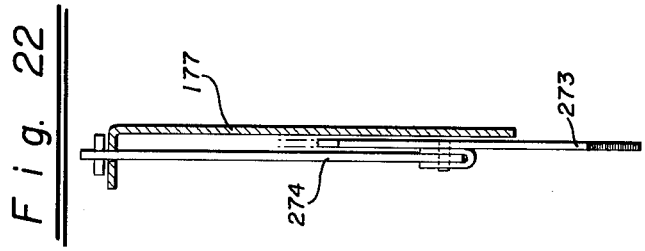
FIGURE 22 is a view partially in cross-section showing the linkage connecting the take-out belt assembly to the frame carrying the drums.

The first take-out belt assembly consists of a pair of side frame members 273, the lower ends of which are pivotally connected to the side members 177 and 178 by links 274 mounted on the side frame members as shown particularly in FIGURE 22 to accommodate the change in length which occurs in the vat 151 during heating and cooling of the vat.

Shafts 275 and 276 are rotatably journaled in the side frame members 273. Each carries a pair of sprockets 277. The sprockets 277 engage chains 278 mounted on the sides of the endless belt 279 and serve to drive the belt. Another sprocket 281 is mounted on the shaft 276 and is driven by a chain 282 mounted on the output sprocket 283 of a speed reducer 286 driven by a motor 287. The chain 282 also drives an additional sprocket 284 for the second take-out belt assembly 272 as hereinafter described.

Figure 21:
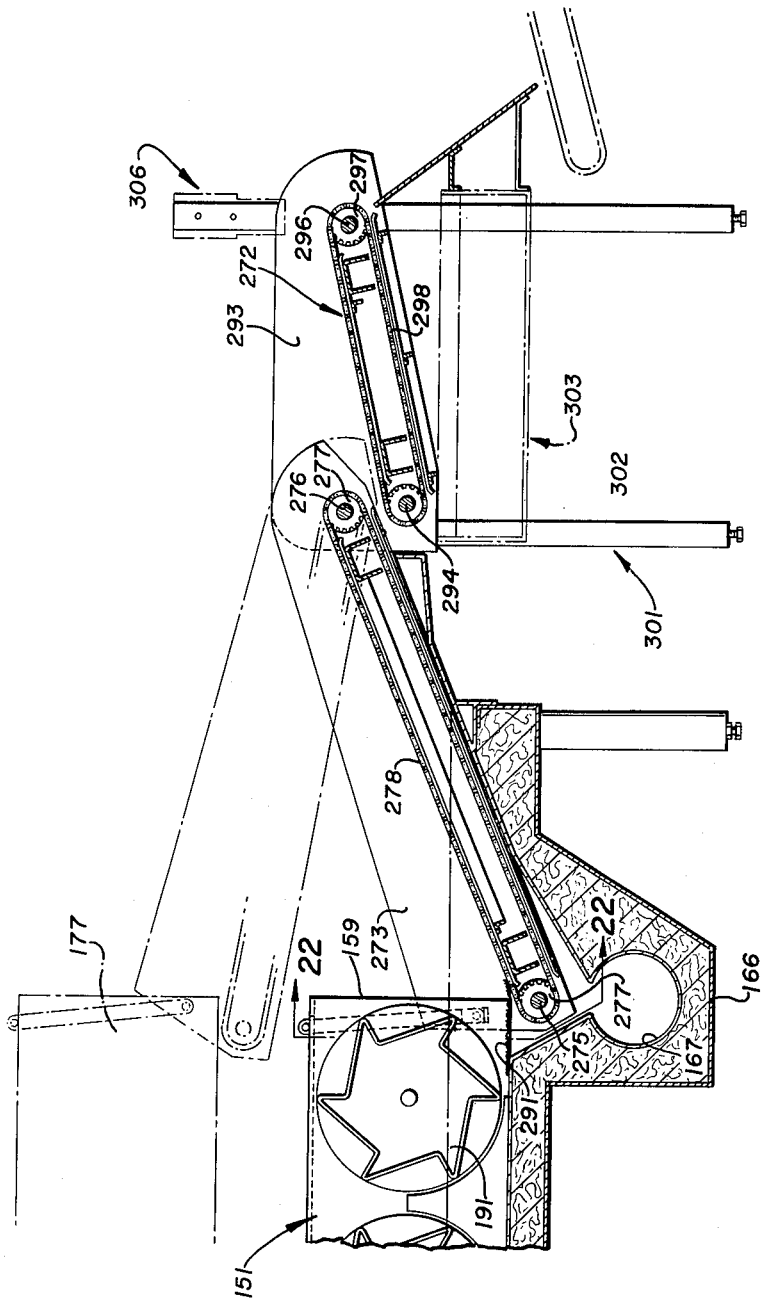
FIGURE 21 is a side elevational view, partially in cross-section, showing the take-out belt assembly which includes the salter belt assembly.

A seal plate 291 is mounted on the lower end of the first take-out conveyor and overlies the bottom wall of the vat 151 as shown particularly in FIGURE 21 to prevent potato chips and the like from dropping down beneath the bottom of the conveyor and into the drain pipe 167.

The second take-out belt assembly or salter belt assembly consists of a pair of side frame members 293 which are pivotally mounted on the shaft 276 of the first take-out belt assembly. A pair of shafts 294 and 296 are rotatably journaled in the side frame members, and each is provided with a pair of sprockets 297 which engage the chains (not shown) fixed to the sides of the mesh belt 298. The shaft 294 is driven by the sprocket 284.

The salter belt assembly is supported by a framework 301, carried by legs 302. A hopper 303 is mounted within the framework and is adapted to collect fines, small fragments of potato chips and the like which drop through the belt.

Salter means 306 is disposed above the salter belt and is adapted to disperse salt over the potato chips as they pass over the salter belt.

*Chute assembly and inspection belts*

After the potato chips have been salted they pass onto a chute assembly consisting of chutes 309 and 311 which divide the potato chips passing from the salter belt into two separate lanes and pass the potato chips onto a pair of inspection belts 312. A plurality of dividers 314 are provided in each of the chutes and serve to provide equal distribution of the potato chips on the inspection belts.

Another pair of belts 316 are disposed below the inspection belts 312 and 313 and serve to carry off any discolored potato chips which are removed from the inspection belts by workers. These discarded potato chips are deposited in a container 318.

Figure 23:
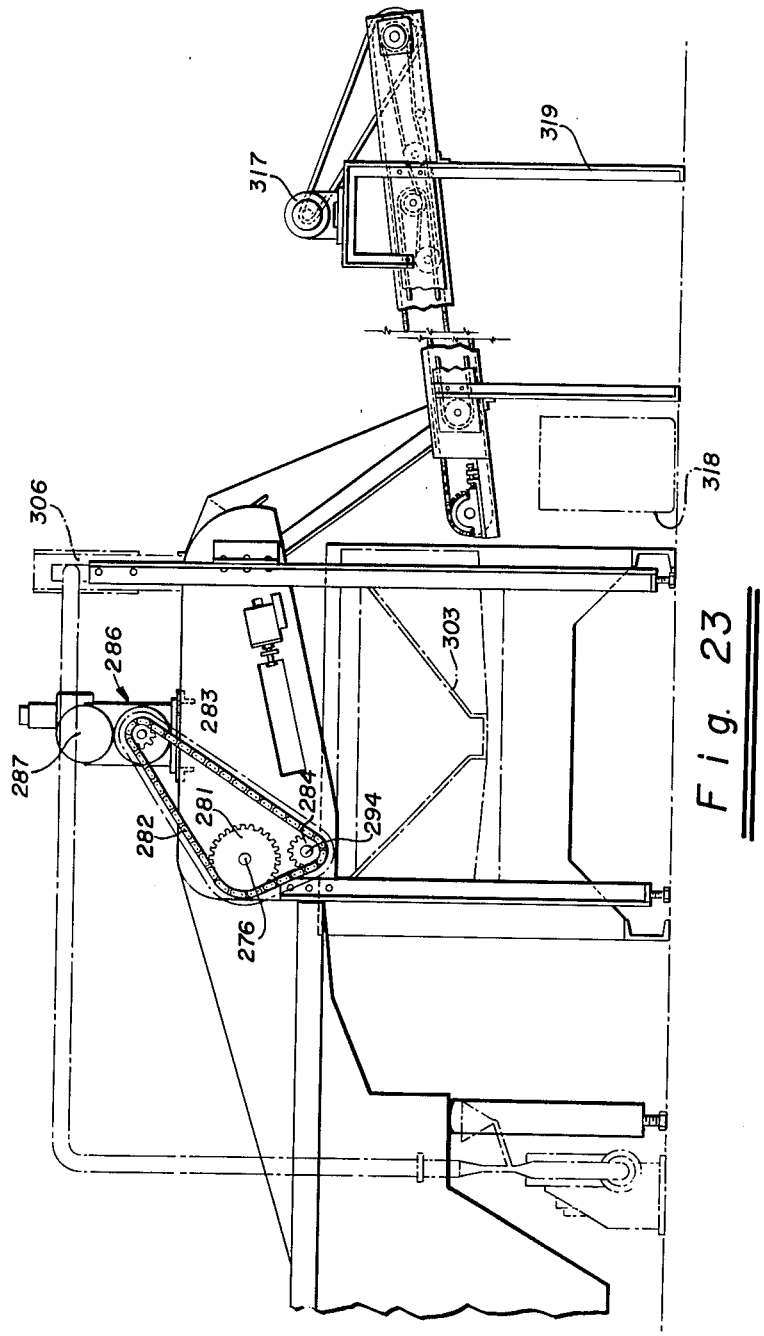
FIGURE 23 is a side elevational view, partially in cross-section, showing the salter, and the inspection belts.
Figures 24, 25:
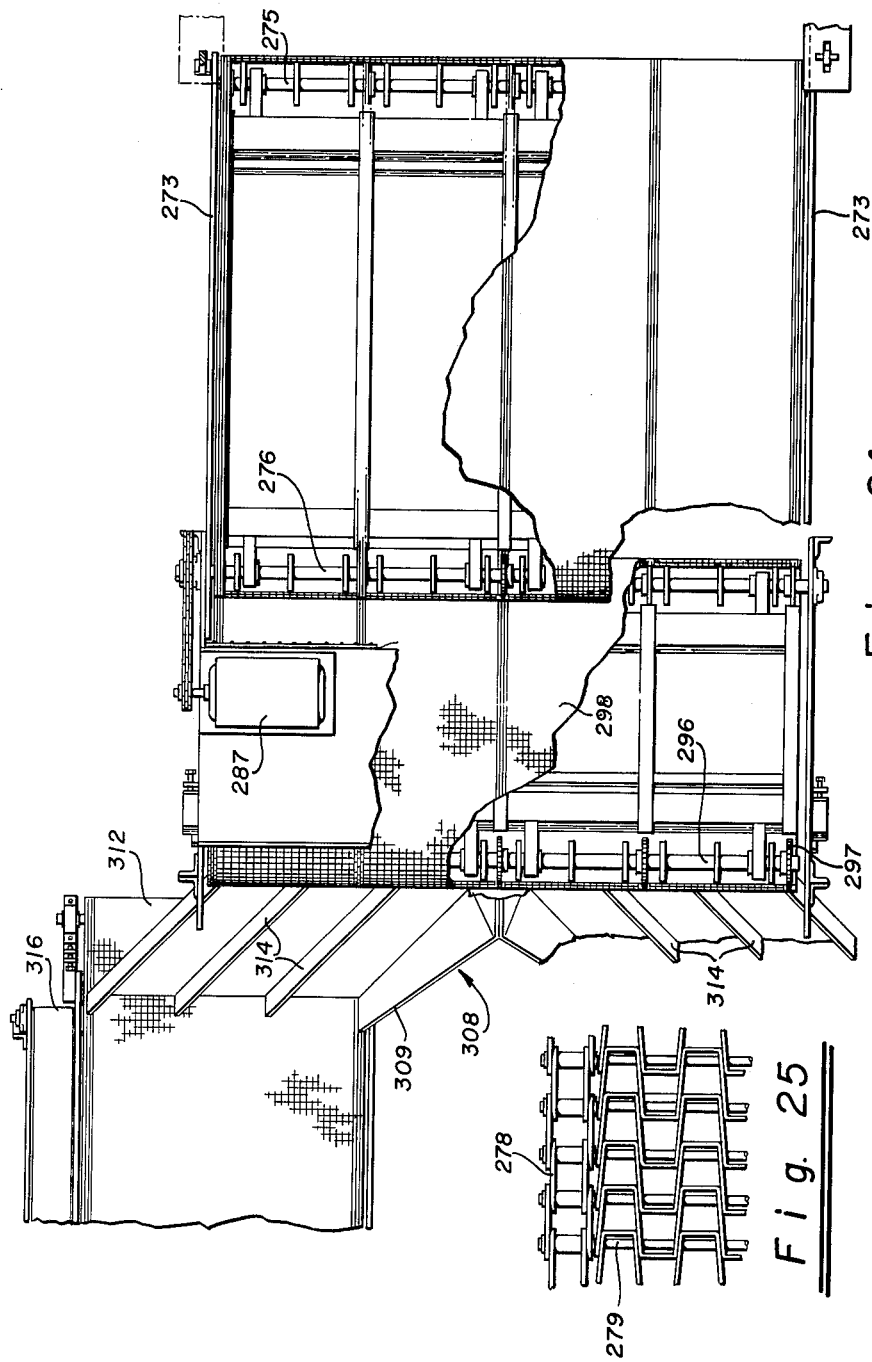
FIGURE 24 is a plan view of the salter and inspection belts shown in FIGURE 23.
FIGURE 25 is a detailed view of a portion of the chain utilized in the take-out belt.

The inspection belts 312 and the belts 316 are carried by a framework 319. The inspection belts 312 are driven by motor 321 in the manner as shown particularly in FIGURE 23. The belts 316 are driven by the belts 312 and 313 as also shown in FIGURE 23.

It is apparent from the foregoing that we have provided a new and improved food washing and cooking apparatus which is particularly adapted for the washing of potato slices and the cooking of the same to produce potato chips. It is also readily apparent that this apparatus is readily adaptable for cooking many other types of foods which can be processed in oil or fats. With our apparatus, food product can be obtained which has a uniform color with a uniform moisture and oil content.

We claim:

1. A continuous flow food cooking system comprising a cooker including a vat adapted to hold a quantity of heated cooking oil, conveying means for introducing a product at a uniform rate into the vat to be cooked, said conveying means delivering said product to the vat evenly distributed across the path of product movement, means serving to remove excess water from the product prior to entry thereof into the vat, the last named means including air jet means forming a slanting curtain of relatively high pressure air impinging upon the product and directed against the direction of movement thereof to remove the excess water in a direction leading away from the vat, said last named means also including upper and lower perforated conveyors for retaining and advancing the product while it moves through the curtain of air, drum means serving to positively advance the laterally distributed product at a uniform rate along the vat, means defining a plurality of adjacent channels in the vat laterally of said path of product movement, an end region of the vat being disposed downstream of the air jet means to receive the product, means providing a relatively thin, flat, broad stream of oil to flow along said path in said region to quickly remove the product from said region and advance the product in the vat further along said path, said stream being directed to quickly remove the product from said region and feed the product toward the drum means.

2. A continuous flow food cooking system comprising a cooker including a vat adapted to hold a quantity of heated cooking oil, conveying means for introducing a product at a uniform rate into the vat to be cooked, said conveying means delivering the product to the vat evenly distributed across the path of product movement, product spreader means disposed to receive washed food products and spread same uniformly across the path of movement thereof, said spreader means including a tank, a pair of drums, means for rotating said drums in opposite directions, means providing a continuous flow of water along said path, one of said drums causing a backwash of water at the upstream end of said flow serving to laterally spread out the product thereat, an end region of the vat being disposed to initially receive the product from the conveying means evenly distributed laterally of the path of movement of the product, means providing a relatively thin, flat, broad stream of oil to flow along said path in said region to quickly remove the product from said region and advance the product further along the path in the vat, drum means serving to receive the product from said region and positively advance same at a uniform rate of advance along the vate, and means defining a plurality of adjacent rectilinear channels in the vat.

3. In a food treatment apparatus, a cooker comprising a vat adapted to hold a quantity of heated oil, a plurality of spaced parallel plates disposed in the vat and extending longitudinally of the vat to define a plurality of adjacent rectilinear channels spaced laterally of and extending longitudinally of the vat, said rectilinear channels being of substantially equal length, said plates being formed with aligned recesses extending in a lateral direction, means for introducing the product at a substantially uniform rate into the cooking oil in the vat and into the rectilinear channels, drum means extending across the vat and disposed in the recesses in the plates for positively advancing the product in the oil, said drum means including means in alignment with the plates and cooperating with the plates, said side plates together with said drum means serving to prevent substantial sidewise travel of the product as it is advanced through the vat.

4. Food treatment apparatus as in claim 3 together with means for creating a continuous flow of oil through said vat from an inlet end to an outlet end, and means formed in the vat to cause oil entering the vat to flow in a relatively broad, thin, flat upwardly inclined stream in a region of the vat adapted and disposed to receive the product as it is introduced into the oil.

5. In a food treatment apparatus, a cooker comprising a vat adapted to hold a quantity of heated oil, means for introducing the product at a substantially uniform rate into the cooking oil in the vat, drum means for positively advancing the product in the oil, and means defining a plurality of adjacent rectilinear channels spaced laterally of the path of movement of the product, each channel including means formed on the drum means as well as means in the vat aligned with the last named means, said drum means and channels maintaining a uniform rate of advance of the product through the vat, means for creating a continuous flow of oil through said vat from a rear zone to a forward zone, external heat exchange means, means for directing a flow of heated oil from the heat exchanger into said vat at a plurality of positions spaced along the path of product movement through the vat, means disposed in the rear zone of the vat and serving to cause oil entering the vat to flow in a relatively broad, thin, flat upwardly inclined stream in a region of the vat adapted and disposed to receive the product as it is introduced into the oil and advanced by said drum means, and means for accommodating a difference in expansion and contraction between the top and bottom portions of the side walls of the vat caused by the differential in temperature between the top and bottom portions of the side walls, said means for accommodating the differential in expansion and contraction of the upper and lower portions of the side walls of the vat consisting of tapered V-shaped portions formed in the side walls of the vat.

6. In a food treatment apparatus, a cooker comprising a vat adapted to hold a quantity of heated oil, means for introducing the product at a substantially uniform rate into the cooking oil in the vat, drum means for positively advancing the product in the oil, means defining a plurality of adjacent rectilinear channels extending laterally of the path of movement of the product, each channel including means formed on the drum means as well as means in the vat aligned with the last named means, said drum means and channels maintaining a uniform rate of advance of the product through the vat, spreader means disposed to receive washed food products and serving to spread the same uniformly across the path of movement thereof, said spreader means including a tank and means providing a continuous stream of water moving through the tank in the direction of product movement and disposed whereby the product is received into the stream at one end and delivered from the other, means moving the surface of the stream to provide a backwash thereof in the region of receipt of the product into said tank and acting to direct the product downwardly beneath the surface of the stream to permit forward movement of the product along said path thereby spreading same, and means downstream of the last named means acting to advance the product along said path.

7. Food treatment apparatus as in claim 6 wherein both the last named and penultimate named means include a rotating reel, said reels being arranged for counter-rotation to each other, one of said reels serving to generate said backwash and the other of said reels serving to move said product along said path away from the first named reel.

8. Food treatment apparatus as in claim 6 further including means for removing excess water from the product subsequent to delivery from said tank and prior to being introduced into said cooking vat, said means including conveying means moving in the direction of said path and carrying the product, evenly distributed laterally thereacross, from said tank to said vat for delivery thereto, and further including air jet means forming a slanting curtain of relatively high pressure air acting to impinge upon the product against the direction of movement thereof thereby removing and directing excess water away from the cooking vat.

References Cited by the Examiner

UNITED STATES PATENTS

| | | | |
|---|---|---|---|
| 958,812 | 5/1910 | Judge | 134—153 X |
| 1,086,248 | 2/1914 | Varian | 99—406 |
| 1,290,396 | 1/1919 | Steere | 134—153 X |
| 1,401,945 | 12/1921 | Morris | 99—406 |
| 2,056,845 | 10/1936 | Ferry | 99—405 |
| 2,081,851 | 5/1933 | Darby et al. | 259—6 |
| 2,546,163 | 3/1951 | McBeth | 99—404 |
| 2,585,293 | 2/1952 | Ashton | 99—404 |
| 2,715,869 | 8/1955 | Salvo | 99—404 |
| 2,833,203 | 5/1960 | Benson et al. | 99—404 |
| 2,858,038 | 10/1938 | Dahm | 202—268 X |
| 2,934,001 | 4/1960 | Cunningham et al. | 99—404 |
| 2,935,034 | 5/1960 | Jacobs | 15—306.2 X |

FOREIGN PATENTS

| | | |
|---|---|---|
| 166,643 | 7/1921 | Great Britain. |
| 821,027 | 9/1959 | Great Britain. |

ROBERT E. PULFREY, *Primary Examiner.*

GEORGE NINAS, JR., JEROME SCHNALL, *Examiners.*